(No Model.)

S. HUFFMAN.
FLY TRAP.

No. 438,108. Patented Oct. 7, 1890.

Witnesses
S. B. Brashears Jr.
Will E. Aughinbaugh

Inventor
Samuel Huffman

UNITED STATES PATENT OFFICE.

SAMUEL HUFFMAN, OF NIOTA, KANSAS.

FLY-TRAP.

SPECIFICATION forming part of Letters Patent No. 438,108, dated October 7, 1890.

Application filed February 15, 1890. Serial No. 340,511. (No model.)

*To all whom it may concern:*

Be it known that I, SAMUEL HUFFMAN, a citizen of the United States, residing at Niota, in the county of Chautauqua and State of Kansas, have invented new and useful Improvements in Fly-Traps, of which the following is a specification.

The nature of my improvements consists in having continuous aprons revolving in conjunction, each bringing flies under and leaving them in the one and same cage. I attain this object by the mechanism illustrated in the accompanying drawings, in which—

Figure 1:
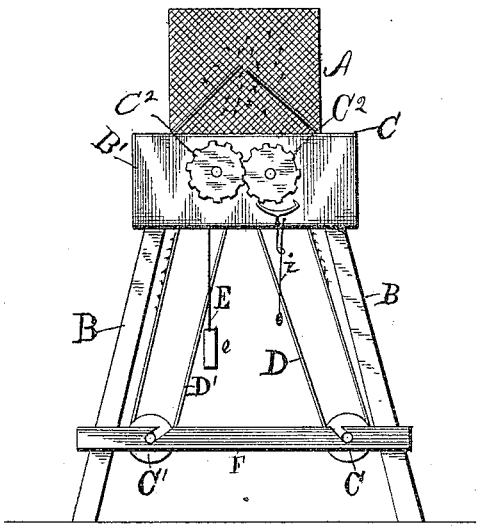
Figure 2:
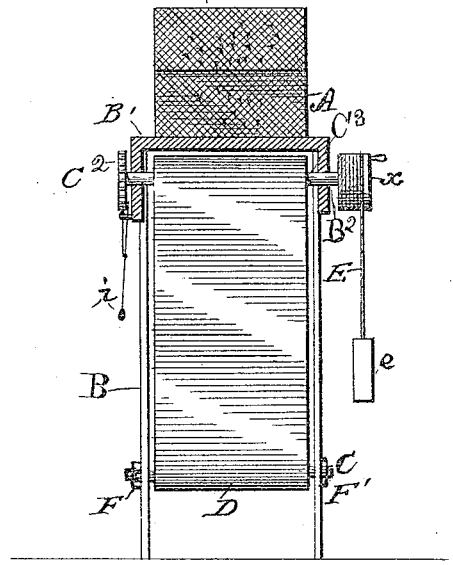

Figure 1 is a front elevation of the machine. Fig. 2 is a cross-section on line $x\ x$, Fig. 1.

Similar letters refer to similar parts of the two views.

Four standards B B, cross-bars F, and plates B' constitute the frame-work of the machine. Supported by the frame B are four drums having their axle-bearing in the cross-bars F F', Figs. 1 and 2. The two upper drums have their bearings in plate B' and B², Figs. 1 and 2. Around the drums, one above and one below, is an endless apron of cotton cloth or any suitable material. (Shown at D, Fig. 2, and at D D, Fig. 1.) Upon one end of each of the drum-shafts $C^3$, Fig. 2, and $C^4$, Fig. 1, is fixed a gear-wheel engaging one with the other. (Shown at $C^2$, Fig. 1, and $C^2$, Fig. 2.) Upon the opposite end of one drum-shaft is stationed the spool $x$, around which the cord supporting the weight $e$ is wound. (Shown in Fig. 2.) A verge and pendulum must be used when the machine is moved by a weight. Clock-work or any suitable machinery or method may be applied to move the canvas.

To induce the flies to light upon the aprons, each apron must be charged with a suitable bait, as molasses thinned with water.

When the machine is in motion, the flies alighting on the aprons D are carried up under the wire cage A and are scraped off the canvas, and, seeing light above, they pass up into the cage and are imprisoned therein.

By the drums being geared together the aprons must necessarily move in the same direction, which may be perpendicular, oblique, or horizontal. The aprons will revolve either way, according to the direction in which the cord is wound upon the spool. The flies will be caught if carried up outside, or if the motion of the rolls and of the canvas be reversed.

Having thus fully explained my invention, what I claim as my invention, and desire to secure by Letters Patent, is—

A fly-trap having a suitable frame, a cage mounted thereon, rollers mounted in said frame, the upper pair thereof being geared together, and the lower pair secured to bars on the frame and divergent from the upper pair, endless belts on said rollers and converging thereon beneath the cage, and means for actuating the rolls and the belts so as to discharge insects therefrom beneath the cage, as shown and described.

SAMUEL HUFFMAN.

Witnesses:
ALEX. S. STEWART,
WILL E. AUGHINBAUGH.